United States Patent [19]

Urech

[11] Patent Number: 4,591,687
[45] Date of Patent: May 27, 1986

[54] ELECTRICAL RESISTANCE-PRESSURE WELDING PROCESS FOR WELDING PARTS OF WORKPIECES MADE OF ALUMINUM MATERIALS AND AN APPARATUS AND ELECTRODE THEREFOR

[75] Inventor: Werner Urech, Kaiselstuhl, Switzerland

[73] Assignee: Paul Opprecht, Bergdietikon, Switzerland

[21] Appl. No.: 469,033

[22] Filed: Feb. 23, 1983

[30] Foreign Application Priority Data

Mar. 4, 1982 [CH] Switzerland ............... 1325/82

[51] Int. Cl.$^4$ .................................................. B23K 11/00
[52] U.S. Cl. ........................................ 219/93; 219/118
[58] Field of Search ................. 219/93, 91.21, 118, 219/119

[56] References Cited

U.S. PATENT DOCUMENTS 1,727,166  9/1929  Frick ................................. 219/119
4,135,075  1/1979  Heflin ............................... 219/118

FOREIGN PATENT DOCUMENTS 129946  1/1929  Switzerland ....................... 219/118

Primary Examiner—C. L. Albritton
Assistant Examiner—C. M. Sigda
Attorney, Agent, or Firm—William J. Daniel

[57] ABSTRACT

Spot- and projection-welding of aluminum sheets has always been connected with difficulties mainly because of the surface layers of aluminum oxide, and even by pickling, these difficulties could be only partly eliminated. The main difficulties have always been insufficient electrode life times, the unsatisfactory quality of the weld and especially the unsolved problem of achieving good quality welding and long electrode-life when using un-pretreated aluminum sheets. The problem has been solved in principle by using electrodes having profiled contact-surfaces, by means of which the layer of oxide is broken during pre-pressing and a direct contact between the electrode and unoxidized material of the workpiece is provided, the contact-resistance of which is lower than the portion of the overall resistance of the point of weld formed by the metal of the aluminum sheets to be welded together. In an appropriate welding machine, the means for switching-on the welding current are controlled in such a manner that the welding current is switched on only after a sufficiently large contact area and therewith a sufficiently low contact-resistance of this contact has been reached.

18 Claims, 14 Drawing Figures

Fig. 1 RESILIENT ELECTRODE FOLLOW-UP

RESILIENT ELECTRODE FOLLOW-UP

ELECTRICAL RESISTANCE-PRESSURE WELDING PROCESS FOR WELDING PARTS OF WORKPIECES MADE OF ALUMINUM MATERIALS AND AN APPARATUS AND ELECTRODE THEREFOR

The invention relates to an electrical resistance-pressure-welding process for welding together parts of workpieces consisting of aluminum and/or alloys thereof, with the aid of a welding current supplied by electrodes, wherein the parts of the workpieces to be welded together are firstly pre-pressed before the welding current is switched on and pressure is maintained upon the parts of the workpieces to be welded together at all times while the current is flowing, by means of resilient electrode follow-up, and to an apparatus and an electrode for the execution of this process.

Processes of this kind have been known for some considerable time in the form of spot-welding and so-called projection welding of aluminum sheets, e.g. from the textbook "Technologie der Maschinenbaustoffe", by P. SCHIMPKE, S. HIRZEL, Verlag Leipzig, 1949, page 259. However, these known process for spot- and projection-welding of aluminum sheets have hitherto always been associated with difficulties, the main cause of which is the material properties of aluminum materials, more particularly the formation of surface-oxide and the relatively high electrical conductivity and thermal conductivity of aluminum and alloys thereof. Thus the most recent technical literature in this connection, for example, the article "Projection-welding of deep-drawing aluminum materials" in the periodical "Aluminum", 57 Jg., 1981, 9, pages 607–611 still mentions unsatisfactory electrode-life during projection-welding of aluminum sheet. There have also been similar experiences of relatively short electrode-life during spot-welding of aluminum sheets which, as is well known, is widely used in the aircraft industry. Although relatively long electrode-life can indeed be achieved at the expense of weld-quality, in all tests hitherto carried out, this increase in electrode life has been associated with, even after a relatively short service life, a successive decline in the shear-strength of the welded joint and increasing impairment of surface properties at the weld-location, accompanied by corresponding wear phenomena at the electrode contact-surfaces, such as pitting and alloying. Thus, for example, investigations carried out by the Danish Welding Institute (1979, Report 79.15 and the periodical "Schweissen und Schneiden" 33,1981, Vol. 10, pages 554–555) into the spot-welding of untreated aluminum sheets with electrodes provided, to this end, with added aluminum alloys, are known in which, although electrode lives of 6000 welds, with no intermediate treatment of the electrodes were obtained, the quality of the welded joints thus obtained leaves very much to be desired, both in respect of surface quality and of shear strength, as shown by subsequent testing. Furthermore, so-called spot-weld-gluing, used to increase the load-carrying capacity of spot-welded joints between aluminum sheets, has as yet-except for the special field of aircraft construction (in which the permissible costs per welding point is relatively high and therefore, for example, a short electrode-life plays only a minor role)-failed to emerge from the status of scientific investigation, as indicated, for example in the article "Technologische Utersuchingen zum Punktschweisskleben von Karosserieblechen aus Aluminium" in the periodical "Bänder Bleche Rohre" 1-1980, pages 27–33. This lack of progress of this process would appear to be attributable mainly to the relatively high cost of pretreating the surfaces of the aluminum sheets during production, of additional pickle-degreasing or alkaline degreasing, of applying the adhesive prior to processing, to the relatively long overall welding times of more than 2 seconds, to the often unavoidable spattering arising during this process, and, not least, also to the relatively high electrode-wear and relatively short electrode-life arising in spot-weld-gluing.

Experience, therefore shows that the producing of high-quality welded joints between aluminum sheets, in any case by resistance-pressure-welding, is only possible under restrictive conditions, such as allowing for a relatively short electrode-life or-as indicated, for example, in the article "Anwendung des Buckelschweissens für Aluminium-werkstoffe" in the periodical "Aluminium", 56,JG., 11, pages 723–725-by using a special design of projection, not known in detail. Thus no practical, problem-free and low-cost aluminum welding process has as yet been available for mass-production purposes such as the production of automobile bodies and body-parts made of aluminum. Although it is true that aluminum spot-welding has been used in motor-vehicle construction, as indicated, for example, in the periodical "Metal Construction", September 1976, pages 392–395- this was almost exclusively in connection with high-priced vehicles such as exclusive passenger cars, omnibuses and trucks, in which relatively short electrode-life (also mentioned in this article), and the resulting increased costs, were not critical factors, whereas for the mass-production of inexpensive motor-vehicles, consideration can be given only to low-cost, essentially problem-free welding processes ensuring especially a sufficiently long electrode-life, which have hitherto been available only for steel sheets and not for aluminum sheets. Finally, this is probably one of the reasons why aluminum sheets are not widely used in mass-production of auto bodies, in spite of its low weight and less liability to corrosion.

The main reason why the spot-welding of steel sheets raises substantially fewer problems than that of aluminum sheets is known to be that the specific resistance of the steels normally used for steel sheets is about five times that of the normal commercial aluminum alloys used for aluminum sheets, and that, furthermore, the resistance per unit area of the layer of aluminum oxide on aluminum sheets, in any case of untreated sheets, is substantially higher than the resistance per unit area of the layer of iron oxide on steel sheets. For, in resistance welding, the heating of the point of weld comes from the heat produced by the electrical current, and this heat, which is proportional to the overall resistance of the point of weld between the electrodes, is distributed over the individual areas of the point of weld arranged in series in the direction of the current (external oxide layer I-metal layer I-internal oxide layer I-internal oxide layer II-metal layer II-external oxide layer II) in the proportion of the partial resistances of these areas, and in the spot-welding of steel sheets, because of the relatively high specific resistance of steel and the comparatively low resistance of the layer of iron oxide covering it, 70–90% of the overall resistance of the point of weld and therefore also of the heat produced by the current falls to the metal and the internal layers of oxide, whereas in the spot-welding of untreated aluminum sheets, because of the relatively low specific resistance of aluminum materials and the comparatively high resistance of the layer of aluminum oxide covering them, only 40–50% of the overall resistance of the point of weld and therefore of the heat produced by the current falls to the metal and the internal layers of oxide, so that at least in the initial phase of the welding process, the major part of the heat produced by the current arises in the two external layers of aluminum oxide. Now, indeed this heat arising in the external layers of oxide is initially taken up by the electrodes which lie directly upon the layers of oxide and which, at the start of the welding process, are still relatively cold, and this is true in the spot-welding of steel sheets as well as of aluminum sheets. However, the consequences are quite different. Thus, in the spot-welding of steel sheets, because of the relatively small amount of heat falling to the external layers of oxide, the heating of the metal and the internal layers of oxide at the point of weld to the welding temperature takes place relatively rapidly and, during this short time, the relatively small amount of electrical heat in the external layers of oxide can be completely taken up by the electrodes, without the latter becoming unduly hot. On the other hand, in the spot-welding of untreated aluminum sheets, the thermal capacity of the electrodes is, as a rule, not sufficient to take up the relatively large quantities of electrical heat falling to the external layers of oxide, without heating the electrode contact-surfaces to temperatures above the alloying-on-temperature. The reasons for this are: first, that because heating the metal and the internal layers of oxide to the welding temperature requires, due to the relatively small amounts of electrical heat in these areas, either a correspondingly higher welding current or a correspondingly longer welding time, and therefore, there is added to the relatively large amounts of electrical heat in the external layers of oxide the relatively high values of the welding current and welding time, and second that because the alloying-on-temperature of aluminum materials is substantially lower than that of steel, in the spot-welding of untreated aluminum sheets, an alloying-on of aluminum to the electrode contact-surfaces usually takes place already after only a few welds and some times even at the first weld. The occurrence of this alloying-on already at the first weld indicates that the thermal capacity of the electrodes is too low, and the occurrence after several welds indicates inadequate electrode cooling or a too rapid welding sequence, resulting in successively increases in the initial electrode temperature at the start of individual consecutive welds.

In the course of development, naturally also in the resistance-pressure welding of aluminum sheets, there has been a certain amount of progress in overcoming these problems, but there has so far been no breakthrough in the sense of a resistance-pressure welding of aluminum sheets being similarly free of problems as that of steel sheets.

For instance, it has been possible to increase somewhat the insufficient portion of the overall resistance of the point of weld formed by the metal and the internal layers of oxide by means of the use of electrodes having cambered contact-surfaces since, when such electrodes are used, the sheets are pressed very heavily together at the centre of the predetermined point of weld during pre-pressing and this arching of the sheets in the area surrounding the predetermined point of weld, and thus prevents the formation of a gap between the sheets in this area. This restricts the effective contact-surface between the superimposed sheets to a value only slightly larger than the effective electrode-to-sheet contact surface, whereas in the case of electrodes with flat contact-surfaces, the effective contact-surfaces between the two sheets are usually more than twice the total contact-surface, or the cross-sectional area, of the electrodes. (From the purely theoretical point of view, in the case of electrodes having flat contact-surfaces, the effective contact-surfaces between the two superposed sheets would be larger by orders of magnitude than the cross-sectional area of the electrodes, and thus the portion of the overall resistance of the point of weld formed by the metal of the parts of workpieces to be welded together would be substantially smaller than that of the two electrode-to-sheet contact resistances. In practice, however, also with electrodes having flat contact-surfaces, the pre-pressing causing arching of the sheets in the vicinity of the predetermined point of weld and thus produces a gap between the two arched sheets in the vicinity of the predetermined point of weld which restricts the effective contact-surface between the two sheets, said gap arises, of course, only at a greater distance from the centre of the point of weld than when electrodes with cambered contact-surfaces are used). The reduction in the effective contact-surfaces between the two sheets achieved with the use of electrodes having cambered instead of plane contact-surfaces inevitably resulted in a corresponding reduction of the current-flow cross-section in the two sheets and thus in an increase of the portion of the overall resistance of the point of weld formed by the metal and the internal layers of oxide, but, the reduction was, as a rule, less than 10%. However, this was still enough to increase electrode-life in spot-welding of aluminum sheets, or the number of spot-welds carried out before the first occurrence of alloying-on to the electrode contact-surfaces, to such an extent that spot-welding of aluminum sheets could be used in practice for specific purposes, for example in the already above mentioned aircraft construction, where increased welding costs as for polishing the electrodes after, for example, about 10 spot-welds, was of minor importance as compared with the advantages obtained by the use of aluminum, for example the saving in weight. However, the actual problem of inadequate electrode-life was by no means solved in this way; it was merely somewhat lessened.

Further progress by using electrodes with cambered contact-surfaces was indeed possible by subjecting the aluminum sheets to be welded together to pretreatment for the purpose of reducing the thickness of the layer of aluminum oxide on the sheets, for example pickling, since from the reduced thickness of the layers of oxide, there results also lower resistance values in the partial resistances formed by the said layers of oxide, and this results in a relative increase of the portion of the overall resistance of the point of weld, formed by the metal. However, a striking success could also not be reached by these measures, since the proportions of the partial resistance formed by the individual layers of oxide in relation to each other are independent of the variations in layer thickness which affect all of these layers of oxide in the same way. For, for example, in case of a reduction of the partial resistances formed by the individual layers of oxide to about twice the partial resistance formed by the metal of one of the both sheets to be welded together (which, in the case of untreated aluminum sheets corresponds to a reduction of the thickness of the layers of aluminum oxide to less than one fifth), the increase of the portion of the overall resistance of the point of weld formed by the metal an the internal layers of oxide is still less than 10%, and any further reduction in the partial resistances formed by individual layers of oxide, i.e. a still greater reduction in the thickness of the layers of aluminum oxide, comes in the most cases-although technically possible-not into question in practice because of the extraordinarily high current intensities that would be required, and also because of the need for a very short time-lapse between pretreatment and welding since, as is well known, even if the layer of oxide is completely removed from a sheet of aluminum, a new layer will form within a few minutes. However, after all it was possible, with the aid of such oxide-layer-reducing pretreatments, in conjunction with the use of electrodes having cambered contact-surfaces, to increase the electrode-life in spot-welding of aluminum sheets, i.e. the number of consecutive spot-welds carried out after each refinishing of the electrodes, by an order of magnitude of several hundreds, however, this appeared to be the end of the development, since, for this increase in electrode-life, one had to put up with the not inconsiderable additional costs of the said pretreatments and moreover with the also not inconsiderable disadvantage of increased liability of the pretreated aluminum sheets to corrosion, as compared with untreated sheets. Thus the aim of substantially problem-free, low-cost spot-welding process for aluminum sheets could also not be achieved by the combined use of pretreatment and cambered electrode contact-surfaces, for, quite apart from the fact that the requirement for a low-cost process was not met because of the additional costs necessary for the pre-treatment, the resulting electrode-life was too short, in any case for mass-production purposes.

Another way of overcoming the problems arising in resistance-pressure welding of aluminum sheets was to use projection welding. Also in the case of projection welding, there results-because of the fact that the bearing surface between the sheet carrying the projection and the other sheet is restricted to the tip of the projection and is therefore, just as the current-flow cross-section in this area, relatively small-a not inconsiderable increase of the portion of the overall resistance of the point of weld formed by the metal and the internal layers of oxide. However, this increase is not as great as it may appear at first sight, since the projection is already flattened to a greater or lesser degree during the pre-pressing, and this results in an increase in the bearing surface between the sheets and also in a substantial decrease in the bearing surfaces between the electrodes and the sheets since, simultaneously with the flattening of the tip of the projection, the two sheets lift away from the flat electrodes in the vicinity of the projection or of the tip of the projection respectively, and the bearing surfaces of the electrodes on the sheets are therefore reduced to the area of the projection and the immediate vicinity thereof. With hollow embossed round projections which are usual in the projection welding of steel sheets, there are, because of the substantially lower strength of aluminum than that of steel, the flattening of the projection during the pre-pressing, on the one hand, and the simultaneous lifting of the sheets from the electrodes in the vicinity of the projection, on the other hand, often so great as to result in contacts between the sheets in this vicinity and thus in defective welds as a result of the shunts produced by these contacts between the sheets so that hollow embossed round projections are relatively unsuitable for the projection welding of aluminum sheets and therefore, mainly so-called annular projections are used for this purpose (solid projections which would be still more suitable, come usually not into question for production reasons, since it is not feasible to produce sheets with solid projections, but the projection can only be embossed into the sheets). With the use of annular projections for projection-welding of aluminum sheets, the portion of the overall resistance of the point of weld formed by the metal and the internal layers of oxide is about 60–70%, however, the remainder of the overall resistance of the point of weld is not distributed uniformly over the two electrode-sheet contact-resistances, but about two thirds of the remainder, i.e. about 25–20% of the overall resistance, falls to the contact-resistance between the sheet provided with the projection and the electrode associated therewith, since the electrode does not lie upon the sheet in the area of the annular depression located at the back of the projection, and, for this reason, the bearing surface between the electrode and the sheet is substantially smaller than that between the other electrode and the other sheet. Since with an electrode-sheet contact resistance equal to 25–20% of the overall resistance, there results conditions similar to the of untreated aluminum sheets with cambered electrodes, one obtains in the annular-projection welding of untreated aluminum sheets, not withstanding the relatively high portion of 60–70% of the overall resistance of the point of weld formed by the metal and the internal layers of oxide, an electrode life for the electrode contacting the sheet carrying the projection which, absent special measures, is similar to that obtained with spot-welding of untreated aluminum sheets with cambered electrodes. Here again, the electrode life could probably be further improved by the above-mentioned pretreatment of the aluminum sheets, but, the provision of annular projections at the predetermined points of weld and the additional pretreatment of the sheets would increase the costs per weld to such an extent that, for reasons of costs alone, such a process could not be taken into consideration for mass-production. According to a previously unpublished proposal (Swiss Application 5948/81), however, improved electrode-life in the projection welding of aluminum sheets may be achieved with projections of special shapes by means of which deformation of the projection during pre-pressing can be largely avoided, since this also largely eliminates the above-mentioned lifting of the sheets from the electrodes in the vicinity of the projection, which leads to a relatively high contact-resistance between the sheet carrying the projection and the electrode contacting this sheet. While use of the specially shaped projections makes it possible to carry out more than 100 welds, under favourable conditions, before the electrodes have to be refinished or replaced, electrodes lives of this order are still too short for mass-production purposes.

It may therefore be generally stated that, in spite of much effort and a few notable partial successes, there has been no real breakthrough making the resistance-pressure welding of aluminum as problem-free and inexpensive as the resistance-pressure welding of steel, and especially the long electrode life normally obtained in the resistance-pressure welding of steel sheets could not even nearly be achieved in the resistance-pressure welding of aluminum.

It was therefore the object of the invention to provide a process of the type mentioned at the beginning hereof and an apparatus and electrodes for the execution of this process, by means of which parts of work-pieces made of aluminum and/or alloys thereof and especially aluminum sheets can be welded together as problem-free and inexpensively as steel, and by means of which in connection with welded joints of high quality, an electrode life can be obtained substantially exceeding that with known processes of the type mentioned at the beginning hereof.

According to the invention, this is achieved with a process of the type mentioned at the beginning wherein-in order to achieve electrode-workpiece contact-resistances substantially lower than the overall resistance of the point of weld passed by the welding current-at least one of the sides of the workpieces facing the electrodes is superficially deformed plastically during said pre-pressing and before the welding current is switched on in such a manner, that the surface-layer of aluminum oxide cracks at the locations of deformation so that substantially unoxidized workpiece material emerging at the locations of the cracks comes into direct contact, under pressure, with the electrode facing the respective workpiece side, and the area of this direct contact between the electrode and the substantially unoxidized workpiece material becomes so large that the electrode-workpiece contact-resistance becomes lower than the portion of said overall resistance of the point of weld formed by the metal of the parts of the workpieces to be welded together.

The main advantage of this process is that it is possible to obtain with untreated aluminum sheets the same resistance-conditions with regard to the percentage distribution or ratio of the overall resistance of the point of weld between the two electrode-sheet contact-resistances and the portion of the overall resistance formed by the metal and inner layers of oxide, as the resistance-conditions obtained in the resistance-pressure welding and especially in spot- and projection-welding of steel sheets, and that it is even possible to reduce the percentage of the overall resistance of the point of weld formed by the electrode-sheet contact-resistances, in spite of the use of untreated aluminum sheets, to values which are still below the corresponding values obtained in the spot- and projection-welding of steel sheets. Such similar, or even more favourable, resistance conditions than those obtained in the pressure-welding of steel sheets make it possible to obtain in the pressure-resistance welding of aluminum sheets the same advantages which have hithero distinguished the resistance-pressure welding of steel sheets from that of aluminum sheets, e.g. the usability of untreated sheets, the independence or low dependence of the shearing stressability of the welded joints on the number of welds carried out consecutively with the same electrodes, the low dependence of the shearing stressability on deviations from rated values of the operating parameters as, for example, of the current intensity and of the pre-pressing force during welding, the low electrode-wear and -contamination, and the low tendency of alloying-on of workpiece material onto the electrodes and thus increased electro-life. Thus, with the very low percentage of the overall resistance of the point of weld formed in the present process by the electrode-sheet contact-resistances, and with the correspondingly small portion of the overall current-heat at the point of weld due to the electrode-sheet contacts, there is heated first of all, when the welding current is switched on, the sheet-sheet area forming said relatively large contact-resistance between the two sheets and the immediate vicinity of this contact area, i.e. a central area located exactly at the predetermined location of the weld, to the welding temperature, while at the same time, the electrode-sheet contacts still remain relatively cool, since the relatively small amount of current-heat arising at these contacts is carried away initially completely by the still cold electrodes bearing directly upon the sheets. Indeed, as the melting process proceeds, the large amount of current-heat arising in the central area, i.e. at the sheet-sheet contact area, and in the immediate vicinity thereof, passes, because of the higher thermal conductivity of aluminum than that of steel, more rapidly to the electrode-sheet contacts than in the welding of steel sheets. However, on the other hand, the main amount of the current-heat arises initially, because of the substantially lower specific resistance of aluminum, at the sheet-sheet contact area forming the contact-resistance and in the immediate vicinity thereof, i.e. in the central area and thus at a greater average distance from the two electrode-sheet contacts than in the welding of steel sheets, where, due to the substantially higher specific resistance of steel, the main amount of the current heat does not arise at the sheet-sheet contact but arises in the metal and thus at a smaller average distance from the two electrode-sheet contacts, so that said more rapidly passing of the current-heat in aluminum is largely compensated by the greater average distance between the main source of heat and the electrode-sheet contacts, and hence the temperature-increase at the electrode-sheet contacts after said switching on the welding current proceeds in much the same way as in the welding of steel sheets. Because of this relatively slow increase of the temperature at the electrode-sheet contacts in comparison with the corresponding temperature increase in the known methods of resistance-pressure welding of aluminum sheets, there are not reached during the switching on-time of the welding current of these electrode-sheet contacts temperatures of the surface of the aluminum sheets at which an alloying-on of the aluminum material to the contact-surface of the applied electrode would be possible, and also there are not reached tempertures of the electrode contact-surfaces at which pronounced oxidation of the electrode copper, and a consequential electrode contamination altering substantially the electrode-sheet contact-resistances would be possible, while the welding current is switched on. The result of this is a very long electrode-life, which has so far been impossible to obtain with any known process of resistance-pressure welding of aluminum sheets with the same or at least an almost comparable quality of the welded joints. Thus since welding conditions remain approximately constant over a very long electrode-life, the shearing stressability of the welded joints remains almost constant over the entire life of the electrode. Thus the present process has the same advantages as the resistance-pressure welding of steel sheets, and the course of the welding process is also very similar. For example, another advantage of the present process is that because of the relatively small fraction of the overall resistance of the point of weld attributable to the electrode-sheet contact-resistances, almost all of the current energy fed to the point of weld is used for the actual welding process and therefore the time during which the welding current is switched on, or the magnitude of this current can be substantially reduced in comparison with the known methods of resistance-pressure welding of aluminum sheets. This again, in conjunction with the relatively small fraction of the overall resistance of the point of weld due to the electrode-sheet contact-resistances, has the advantage that the amount of heat to be carried away by the electrodes is substantially less than in the known methods of resistance-pressure welding of aluminum sheets, and this makes it possible to use electrodes of lower thermal capacity and thus correspondingly lower weight, which in turn has a favourable effect upon the following-up behavior of the electrodes. In summary, practically all of the problems hitherto preventing the use of resistance-pressure welding in the mass-production of aluminum work-pieces could therefore be overcome by the present process, and a resistance-pressure welding process for aluminum workpieces could be provided that is as problem-free and low in cast as the resistance-pressure welding of steel.

Preferably, in the present process, both workpiece-sides facing the electrodes are plastically deformed in the same manner, in order to obtain electrode-sheet contact-resistances on both sides of the point of weld that is as small as possible. However if the contact-resistance on one side is anyway relatively small, as it may be, for example, in the case of projection welding on the outside of the sheet not provided with the projection, then it may also be of advantage to carry out the said plastic deformation only on the other side, and in this case this other side should face the movable electrode.

The workpiece-sides facing the electrodes should in the present process be plastically deformed in the same manner advantageously at least to such an extent that the electrode-workpiece contact-resistance is less than 30%, preferably less than 20%, of the overall resistance of the point of weld arising immediately after the breakdown of the transition-resistance between the parts of work-pieces to be welded together. However, in order to be able to make unrestricted use of the above-mentioned advantages of the present process, it is desirable to deform plastically the workpiece sides facing the electrodes to such an extent that the electrode-workpiece contact-resistance amounts to less than 10% of the forementioned overall resistance.

In order to achieve initially the greatest possible concentration of the applied welding energy to the actual weld-location, i.e. to the location of the contact between the two parts of workpieces and its immediate vicinity, and thus to reduce as far as possible both the total welding energy applied and the maximal heating of the electrode-sheet contacts, it is desirable to deform plastically in the said manner the workpiece sides facing the electrode to such an extent that the transition-resistance between the parts of workpieces to be welded together amounts, when the welding current is initially switched on, to more than 90%, preferably between 92 and 98%, of the overall resistance of the point of weld at that time.

Furthermore, from the point of view of concentrating the applied welding energy to the weld-location, and of obtaining as little heat as possible at the electrode-sheet contacts, it may be of substantial advantage to provide one of the two parts to be welded together (for the purpose of increasing the ratio between the portion of said overall resistance of the point of weld formed by the metal of the workpiece-parts to be welded together and the portion of said overall resistance formed by the electrode-workpiece contact resistance), before said pre-pressing at the location provided for the weld, with a projection, preferably with an annular projection or a solid projection. In this case, the workpiece sides facing the electrodes should be deformed plastically in the said manner advantageously to such an extent that the contact surface of the direct contact between the electrode and the substantially unoxidized workpiece-material amounts, immediately before the welding current is switched on, to between one quarter and four times the area with which said projection after deformation during said pre-pressing bears, immediately before the current is switched on, upon the other one of the both workpiece-parts to be welded together, and is preferably approximately equal to this area.

For the purpose of achieving the said plastic deformation, advantageously use is made of electrodes which are provided, at the contact ends, with raised areas to be pressed into the relevant workpiece-part and with set-back areas adjoining the edges of the said raised areas. When such electrodes are used, the pre-pressing pressure used should be so high that raised areas of the electrodes press into the relevant workpiece-parts while parts of the set-back areas come into contact with workpiece-material emerging at the cracks in the layer of aluminum-oxide and being substantially unoxidized. Particularly advantageous are electrodes having a profiled contact-surface, preferably with spiral or concentric-circular grooves of triangular or trapezoidal cross-section. In this connection, in order to prevent changes in the shape of the electrode contact-surfaces during said pressing-in, advantageously use is made of electrodes having raised areas made of a material having a compressive strength higher than that of the workpiece material, preferably of a copper alloy containing alloying elements from the following group comprising chromium, zirconium, cadmium, beryllium, nickel, silicon, manganese, and iron and having a 0.2 yield strength at least three times as high as that of pure soft copper and having at least 75% of the electrical conductivity of pure copper.

The invention also relates to an electical resistance-pressure welding apparatus for welding together parts of workpieces made of aluminum and/or alloys thereof, with electrodes for supplying welding current to the workpiece-parts to be welded together, means for switching on the welding current and means for pre-pressing the workpiece-parts to be welded together, before the welding current is switched on, and for maintaining a continual pressure acting upon the workpiece-parts to be welded together during the flow of the welding current by means of resilient electrode follow-up, characterized in that at least one of the electrodes is provided with means for such plastic deformation of the workpiece side facing it during the pre-pressing that the surface-layer of aluminum-oxide cracks at the deformation locations and substantially unoxidized workpiece material emerging at the crack locations comes into direct contact with the electrode and in that the means for switching on the welding current are controlled in such a manner that the current is switched on only after a contact-area of the direct contact between the electrode and the substantially unoxidized workpiece material is reached such that the electrode-workpiece contact-resistance is lower than the portion of the overall resistance of the point of weld formed by the metal of the workpiece-parts to be welded together.

In this apparatus, preferably both electrodes used to supply the welding current are provided with means for carrying out the said plastic deformation of the sides of the workpieces facing them. These means comprise advantageously a profiling of the electrode contact-surfaces, preferably with spiral or concentric-circular grooves of triangular or trapezoidal cross-section. For projecting welding of aluminum sheets, the said electrode contact-surface is preferably formed by raised areas lying in a plane and by the surfaces of recesses between the said raised areas forming the profiling, whereas for spot-welding of aluminum sheets, it is better that the electrode contact-surface is formed by raised areas lying in a cambered surface and by the surfaces of recesses between the said raised areas forming the profiling.

The present apparatus may be designed wih particular advantage also for roller-seam welding of aluminum sheets. In this case the electrode-rollers are advantageously provided, at their peripheries forming the contact-surfaces, with grooves, preferably axially-parallel transverse grooves, forming the profiling. However, it is also possible and, under certain conditions, of substantial advantage to provide electrode-rollers cutting into the aluminum sheets. In an apparatus of this kind, designed for roller-seam welding of aluminum sheets, the means for switching-on the welding current should preferably comprise a thyristor-control operating with phase-cutting control and thus keeping free currentless intervals for the advance movement and resulting pre-pressing of the workpiece-parts.

The electrodes in the present apparatus consist preferably of a copper alloy containing alloy parts from the group comprising the substances chromium, zirconium, cadmium, beryllium, nickel, silicon, mangangese and iron, and having a 0.2 yield-strength at least three times as high as that of pure soft copper and at least 75% of the electrical conductivity of pure copper.

The invention also relates to an electrode for the resistance-pressure welding of workpieces made of aluminum materials, characterized by a profiled contact-surface. For projection-welding, the said contact surface is preferably formed by raised areas lying in a plane and by the walls of recesses between the said raised areas forming theprofiling and for spot-welding, the said contact surface is preferably formed by raised areas lying in a cambered surface and by the walls of recesses between the said raised areas forming the profiling. The profiling of the contact surface is preferably formed by grooves having a triangular or trapezoidal cross-section. In a preferred design of the present electrode, the profiling is formed by a spiral groove or concentric-circular grooves. Another advantageous design of the present electrode is provided with a waffle-pattern profile with two groups, at least of approximately of the same size, of grooves respectively parallel with each other, the grooves of the two groups cross each other, preferably at right angles. In this design, the raised areas of the waffle-pattern profile, including the edges thereof, may, with particular advantage, be formed by pins inserted into the electrode and made of a material of a hardness substantially greater than that of the electrode material. The material of the present electrode consists preferably of a copper alloy containing alloying parts from the group comprising the substances, chromium, zirconium, cadmium, beryllium, nickel, manganese and iron, preferably of a copper-chromium-zirconium alloy or a copper cadmium alloy.

The invention is explained hereinafter in greater detail in conjunction with the examples of embodiment illustrated in drawing attached hereto, wherein:

FIG. 1 shows, in partial section, the condition of a weld-location provided with an annular projection for projection welding according to the present process, after pre-pressing and before the welding current is switched on;

FIG. 2 shows, in partial section, the condition of a weld-location for spot-welding according to the present process, after pre-pressing and before the welding current is switched on;

FIG. 3 shows a detail from FIGS. 1 and 2, to an enlarged scale, indicating the penetration, produced by pre-pressing, of the profiled electrode contact-surface, into the workpiece-material, in the central area of the weld-location;

FIG. 9 shows the condition of the contact-surface, facing the projection-side electrode, of the aluminum sheet provided with an annular projection, during projection welding according to the present process, after pre-pressing and before the welding current is switched on;

FIG. 11 shows the condition of the contact-surface, facing the flat-sheet-side electrode, of the flat aluminum sheet, during projection welding according to the present process, after pre-pressing and before the welding current is switched on;

Figure 1:
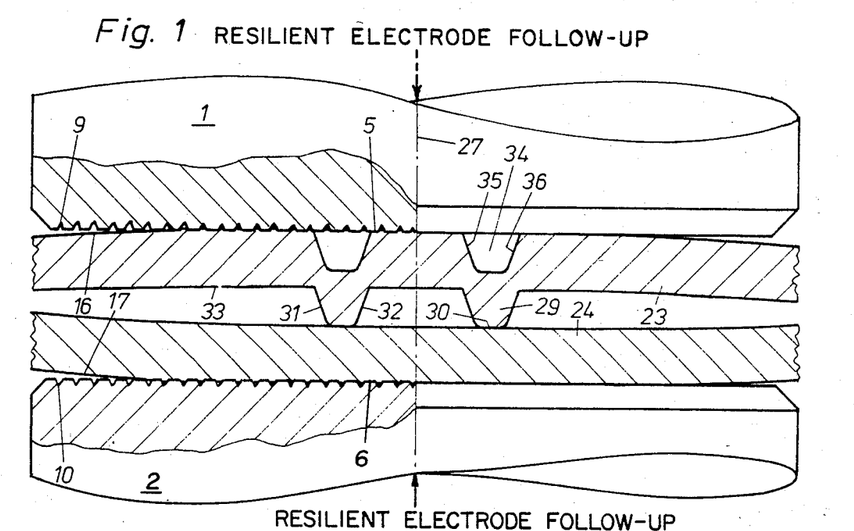
Figures 2, 3:
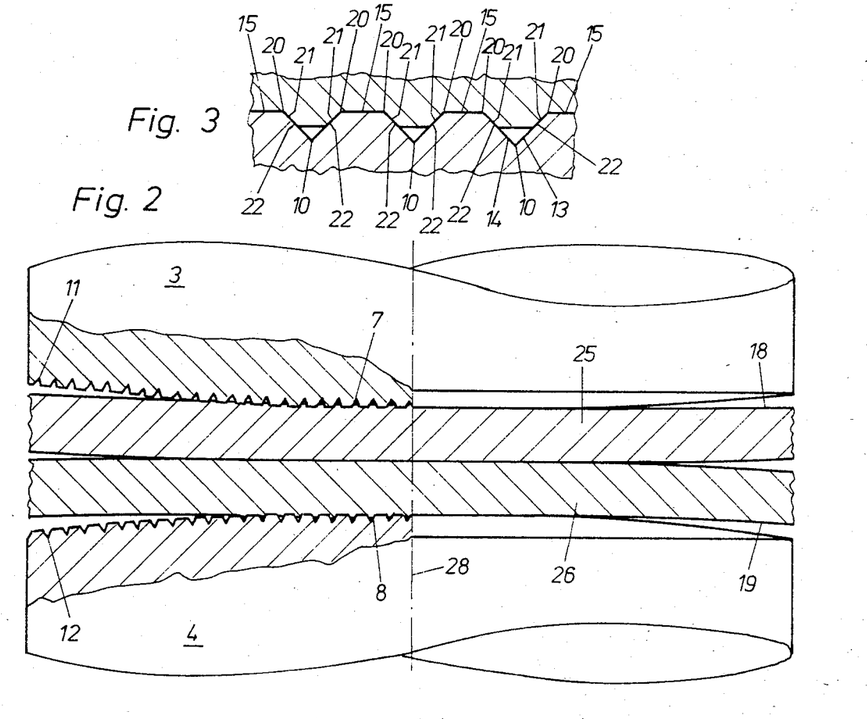

For the execution of the present process, use is made, in the examples of embodiment illustrated in FIGS. 1 and 2, of electrodes 1,2;3,4 having profiled contact-surfaces 5,6;7,8, the profile being in the form of a spiral groove 9,10;11,12 of triangular cross-section, as shown in FIG. 3 to an enlarged scale. The depths of grooves 9,10,11 and 12 is 0.12 mm, while the lateral distance between the centres of adjacent grooves is about 0.43 mm. As shown in FIG. 3, the two walls 13,14 of each groove enclose an angle of about 90°.

This spiral configuration of the profile constituting the electrode-surfaces was selected because this shape greatly facilitates the reworking of the electrodes necessary at predetermined intervals, since all that is required is one operation for recutting the spiral groove and another operation for machining off the raised areas of the contact-surface to match the depth of the reworked groove, and both of these operations can be carried out with one and the same chucking of the electrode in the lathe. There are, however, a number of other advantageous profiles, for example concentric-circular grooves which may be recut simultaneously, in a single operation, with a multiple tool, the raised areas of the electrode contact-surface being also remachined in the same operation with the same multiple tool. Another advantageous profile would be in the form of two groups of equal size of grooves running respectively in parallel with each other, the grooves in the same groups cross each other, preferably at right angles, and thus producing a waffle-type profile. Here again, by using multiple tools, e.g. profiled milling- or grinding-discs having a number of sections corresponding to the number of grooves per group, and a corresponding number, arranged therebetween, of sections of smaller diameter for milling or grinding the raised areas, reworking the electrodes is a relatively simple matter limited to only two operations.

Whereas the main consideration in selecting the design of the grooves constituting the profile is ease of reworking, the cross-sectional shape of the grooves and the width of raised areas 15 between adjacent groove-sections (or the width and depth of the grooves and the distance between the centres of adjacent groove-sections) also has substantial significance in connection with the execution of the present process, since the purpose of the plastic deformation, critical to the present process, of workpiece sides 16,17;18,19 facing electrodes 1,2;3,4 is to crack the surface layers of aluminum-oxide at deformation locations 20, and to provide direct contact between the substantially unoxidized workpiece material 21 emerging at the cracks and the electrodes facing the relevant workpiece-sides 16,17;18,19. To this end, it is necessary, in profiling electrode contact-surfaces 5,6;7,8 in the form of grooves 9,10;11,12, on the one hand, for raised areas 15 of the said electrode contact-surfaces to be pressed into the surfaces of the workpieces during pre-pressing, for which reason the width of the said raised areas should not be too great in order to avoid unduly high pre-pressing forces and, on the other hand, for the raised areas of the electrode contact-surface pressed into the surface of the workpiece, or more precisely, for the areas 22 of the adjoining groove-walls, to come into direct electrical contact, under pressure, with the unoxidized workpiece material 21 adjacent the said groove-wall areas 22. To this end, an obtuse edge-angle is needed between raised area 15 and adjacent groove-wall area 22, since with a rectangular edge, or even an acute edge-angle, the said groove-wall areas would not be pressed onto the said unoxidized workpiece material. In order to achieve adequate contact-pressure, the edge-angle should advantageously be between 120° and 150°, preferably about 135°, as shown in FIG. 3. Said pressing of the raised areas of the electrode contact-surface into the surface of the workpiece is necessary, in this connection, since only under these conditions is there achieved, by means of the shearing effect, produced by this pressure at the edges of the raised areas, the desired direct contact between the electrode contact-surface and the unoxidized workpiece material, whereas with only pressure-loading applied to the surface of the workpiece, as is the case with conventional electrodes having flat or cambered contact-surfaces, even in the unlikley event of a plastic deformation of the surface of the workpiece during pre-pressing resulting in fine cracks in the layer of aluminum-oxide, there would be no direct contact between unoxidized workpiece-material and the electrode contact-surface, since the layer of aluminum-oxide between the electrode and the workpiece, even if it contains fine cracks, maintains, when electrodes having flat or almost flat contact-surfaces, are used, a distance between the said electrode contact-surface and the workpiece material corresponding to the thickness of the layer of oxide, thus preventing direct contact between the electrode contact-surface and the workpiece material.

Since direct contact between the electrode contact-surface and the unoxidized workpiece material is substantially dependent upon the shearing action at edges 20 of the raised areas occurring when the said raised areas are pressed into the surface of the workpiece, and since, the sharper the edges 20 of the said raised areas or the smaller the radius of curvature of the electrode contact-surface at these edges, the better the shearing action, it is furthermore of outstanding significance, for the purpose of achieving long electrode-life, to keep unavoidable wear at these edges, while the apparatus is in operation, as slight as possible. Thus in executing the present process, use is made of electrodes made of special copper alloys having many times the strength of pure soft copper and only slightly lower electrical conductivity, in the designs shown in FIGS. 1 and 2, for example, electrodes 1,2;3,4 made of a copper-chromium-zirconium alloy with about eight times the 0.2 yield-strength and 87% of the electrical conductivity of pure soft copper. In the raised areas, however, specially hard material could also be inserted into the electrode to form the edges thereof. This would substantially reduce edge-wear, since direct contact between the electrode contact-surface and the workpiece material actually takes place at the walls of the grooves and, even in a design of this kind, these could be made of copper (for example, in the case of a waffle-pattern profile on the electrode contact-surface, it would be a simple matter to form the raised areas and the edges thereof by steel pins inserted into the copper electrode). Such a development of the electrodes would have the advantage of increasing electrode-life still further since, in the case of the present process, electrode-life is determined mainly by the shearing action at edges 20 of raised areas 15 of the electrode contact-surface and alloying-on and electrode contamination occur only when this shearing action has been substantially reduced by edge-wear.

Also essential to the prevention of alloying-on to the electrode contact-surfaces are electrodes having an adequate thermal capacity and sufficient cooling. The thermal capacity, or ability of the electrode to absorb heat, is adequate if the temperature of the electrode contact-surfaces remains below the alloying-on temperature while the welding current is switched on and also during any necessary after-pressing time. Electrode cooling is adequate if the heat supplied to the electrodes while the welding current is switched on, and during any after-pressing time, is completely dissipated by the coolant in the period between consecutive welds or, to be more accurate, in the time between the switching-on of the current for consecutive welds. In the examples of embodiment, electrodes 1,2;3,4 used had a diameter of 19 mm and a thermal capacity of about 4 cal/°C. and the coolant flow was 6 liters of water per minute. Under these circumstances, the temperature of the electrode contact-surfaces remained at less than 80% of the alloying-on temperature throughout a whole series of more than 1000 welds.

Also essential in avoiding alloying-on and other forms of electrode contamination is the continual maintenance of an adequate pressure of the electrodes onto the aluminum sheets to be welded together, at least while the welding current is flowing, since the electrode-workpiece contact-resistances, which are sought to be low in comparison with the overall resistance of the point of weld, can be maintained only if the said pressure is adequate. As soon as this pressure drops, these contact-resistances, and of course, the amount of current heat, immediately rise, which may lead directly to alloying-on of workpiece material to the electrode contact-surfaces. In the examples of embodiment according to FIGS. 1 and 2, contact-pressure of electrodes 1,2;3,4 is continually maintained by a follow-up device, shown diagramatically in FIG. 1 of the drawings which comprises spring means and pneumatic means for producing and maintaining a continual pressure of the electrodes 1,2;3,4 also serving to raise and lower one of the electrodes (1 or 3). The said follow-up device is adjusted in such a manner as to apply to electrodes 1,2;3,4 a pressure-force of 400 daN. This pressure-force, in conjunction with the fact that the mass of the movable electrode (1 or 3) is kept as small as possible, is sufficient to impart adequate acceleration to the movable electrode for delay-free follow-up when the projection is softened and compressed in projection welding during the flow of the welding current, or when the material of the workpiece-sides facing the electrodes is softened in spot-welding during the flow of the welding current. The said acceleration is governed by the force difference between the pressure-force and the counter-force which, prior to softening, compensates the pressure-force and, when the softening occurs, falls very rapidly, and the greater the pressure force is, the greater is also the increase of said force difference and therewith of said acceleration providing per time unit effecting said electrode follow-up. When, therefore, in special cases, completely delay-free follow-up is not obtained, which is recognizable by spattering in the vicinity of the point of weld, this can be obtained by increasing the pressure-force applied by the follow-up device. This is particularly important in the case of spot-welding where substantially higher pressure-forces can be used, whereas in projection welding the amount of pressure applied is usually restricted by the stability of the projection.

In carrying out the present process, the two untreated aluminum sheets 23,24;25,26 to be welded together are at first positioned between electrodes 1,2;3,4 in such a manner that the axis 27;28 of the electrode passes, as accurately as possible, through the centre of the predetermined point of weld and, in the case of the example of the embodiment in FIG. 1, through the centre of annular projection 29 provided in aluminum sheet 23. In the embodiment of FIG. 1, the design of the projection 29 is as described in detail in Swiss Application 5948/81, which makes it possible to use a relative high pressure-force, in the present example the 400 daN previously mentioned, and therewith, as also already indicated, a delay-free follow-up of movable electrode 1 during the softening and compression of the annular projection occurring while the welding current is flowing. The average diameter of the annular projection 29 is 3.6 mm, its height before pre-pressing 0.67 mm and after applying the pressure to electrode 1 0.55 mm, the width of its annular bearing area 30 before pre-pressing 0.4 mm and after applying the pressure to electrode 1 about 0.5 mm and the angle of its sides 31,32 in relation to surface 33 of the sheet before pre-pressing about 112°. The annular depression 34 in sheet 23 opposite to projection 29 also has an average diameter of 3.6 mm, and before pre-pressing a depth of 0.67 mm, a width of about 1 mm in the plane of surface 16 of the sheet, and an angle of about 112° between its sides 35,36 and the surface 16 of the sheet. In the embodiment according to FIGS. 1 and 2, sheets 23,24,25,26 are untreated aluminum sheets of 1.5 mm in thickness, made of an aluminum-magnesium alloy containing 3% of magnesium. In electrodes 1,2 in the embodiment of FIG. 1, the raised areas (15 in FIG. 3) of the electrode contact surface 5,6 are in a plane, and in electrodes 3,4 in the embodiment of FIG. 2, the raised areas of the electrode contact surface are in a spherical surface having a radius of curvature of 100 mm.

As soon as the sheets to be welded together have been positioned, the movable electrode 1,3 is lowered onto the point of weld and pre-pressing pressure is applied by the above-mentioned pneumatic and spring means, not shown in the drawing. This is effected with a continual increase in pressure from zero to the predetermined final value, the steepness of the increase being determined by the time-constant of the pneumatic means. As the pressure rises, the following deformations take place in the range of the point of weld and in its vicinity: in the first place, sheets 23,24 and 25,26 are arched in the vicinity of the predetermined point of weld, and that in the embodiment according to FIG. 1 towards each other and in the embodiment according to FIG. 2 away from each other. This arching causes the two sheets 23,24;25,26 to lift in FIG. 1 away from the outer areas of electrode contact-surfaces 5,6 and in FIG. 2 away from each other in the vicinity of the point of weld. The result of this is that, in the embodiment according to FIG. 1, the size of the contact surface between electrode 1 and sheet 23 and between electrode 2 and sheet 24 decreases, as does the size of the contact-surface between sheets 25 and 26 in the example according to FIG. 2; at the same time, the pressure per unit area increases in the range of the remainder contact-surfaces. Furthermore, the raised areas (15 in FIG. 3) of the electrode contact-surfaces 5,6;7,8 press, as the pressure increases, into sides 16,17;18,19, facing the electrodes, of sheets 23,24;25,26. This produces, in the groove-wall areas (22 in FIG. 3) adjoining the edges (20 in FIG. 3) of these raised areas, the desired direct contact between electrode and unoxidized workpiece-material (21 in FIG. 3). Finally, in the embodiment according to FIG. 1, the annular projection 29 is somewhat flattened as the pressure increase. When the final value, 400 daN, of the pre-pressing force is reached, the bearing surface between electrode 1 and sheet 23 has a diameter of about 8.8 mm, that between electrode 2 and sheet 24 a diameter of about 6.5 mm, and that between electrodes 3 and 4 and sheets 25 and 26 a diameter of about 5.2 mm. The bearing surfaces between sheets 23 and 24 and sheets 25 and 26, and thus the contact-surface therebetween, amount, when the final value of 400 daN of the pre-pressing force is reached, between sheets 23 and 24 to about 5.7 mm$^2$ (the bearing surface between projection 29 and sheet 24) and between sheets 25 and 26 to about 32.4 mm$^2$. Further, after the final value of the pre-pressing pressure has been reached, the areas of direct contact between the electrode and the unoxidized workpiece-material (the total of the surfaces of groove-wall areas 22 facing unoxidized workpiece-material) amount between electrode 1 and sheet 23, to about 7.5 mm$^2$, between electrode 2 and sheet 24 to about 6.4 mm$^2$, and between electrode 3 and sheet 25, as well as between electrode 4 and sheet 26 to about 6.8 mm$^2$. The material of sheets 23 and 24 penetrates, in the vicinity of the electrode axis or of the annular depression 34 respectively, to about 40% of the depth of the groove into grooves 9 and 10, while the material of sheets 25 and 26, in the vicinity of the axis of the electrode, penetrates to a depth of about 50% of the depth of the groove into grooves 11 and 12. After the said final value of the pre-pressing force of 400 daN has been reached, the annular projection 29 is still 0.55 mm in height. In the embodiment according to FIG. 1, after the said final value of the pre-pressing force of 400 daN has been reached, the ratio between the individual contact resistances and the associated resistance formed by the metal of the workpiece-parts to be welded together amounts to about 0.105 for the contact-resistance between electrode 1 and sheet 23 and to about 0.121 for the contact-resistance between electrode 2 and sheet 24, and in the embodiment according to FIG. 2, to about 0.16 for the contact-resistance between electrode 3 and sheet 25 as well as for the contact-resistance between electrode 4 and sheet 26. These ratios are determined dynamically by simultaneous oscillograph measurements and records of the welding current and the voltage over the point of weld during the first 5 msec. after the welding current has been switched on, by means of a dual-beam oscillograph with phosphorescent or other storage means, and by determining the overall resistance of the point of weld from the recorded measuring curves at the moment when the transition resistance between the two sheets, formed by the internal layers of oxide on the two sheets in the current-less condition, has been broken-down which is characterized in the oscillogram of the voltage over the point of weld by the terminal point of a sharp drop in the voltage curve following highly irregular voltage fluctuations and by a transition to a voltage remaining almost constant for several milliseconds. This overall resistance of the point of weld, arising immediately after the break-down of the transition resistance between the workpiece-parts to be welded together, is compared with a nominal resistance which is determined, in principle, in the same way as the aforesaid overall resistance (i.e. with sheets of the same thickness, made of the same material, eventually with a projection of the same shape, on the same welding machine, with electrodes of the same dimensions) however with the difference from the determination of the aforesaid overall resistance, that the layers of oxide on the outer surfaces of the two sheets are removed by polishing and that electrodes with smooth, unprofiled contact-surfaces are used. The resulting difference between the aforesaid overall resistance and this nominal resistance thus corresponds to the sum of the contact-resistances of the two electrodes, and the ratio between the individual contact-resistances and the resistance formed by the metal of the workpiece-parts to be welded together is the ratio between said resulting difference and $(1+F_1/F_2_-)=$ times the said nominal resistance, $F_1$ being the area of direct contact between the electrode and the unoxidized workpiece-material at the contact-location under consideration, while $F_2$ is the corresponding contact-surface at the other contact-location. Since, under pre-determined welding conditions (i.e. predetermined thickness of the sheets, predetermined material of the sheets, eventually predetermined shape of the projection on one of the sheets, and predetermined electrode dimensions), the nominal resistance is a constant, and the said oscillogram of the welding current and the voltage over the point of weld may easily be recorded during the first 5 msec of normal welding operation, the said dynamic determination of the ratio between the contact-resistance and the metal-resistance permits continuous and, if necessary automatic, control during normal welding operation. In addition to dynamic determination of the said ratios, static determination with the aid of two samples of points of weld is possible, the first sample with two sheets from which the layer of oxide has been removed only from the inner sides, and the second sample with sheets from which the layer of oxide has been removed from both the inner and the outer sides. In the first sample, the resistance is measured statically with a profiled electrode, and in the second sample with a smooth electrode, in each case after reaching the final 400 daN value of the pre-pressing force. The two measured resistances are then compared as same as in the above-mentioned case the said overall resistance and the said nominal resistance.

Figure 9:
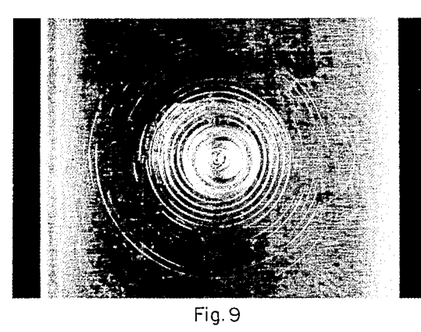
Figure 11:
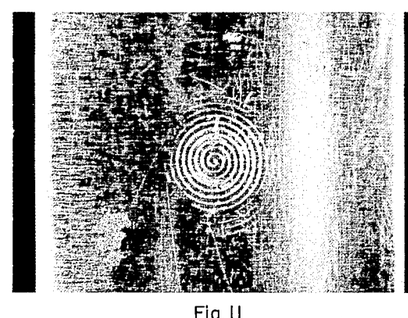

For the embodiment in FIG. 1, the conditions of the sides of the sheets facing the electrodes, after reaching the final value of the pre-pressing force, are shown in FIGS. 9 and 11, and that in FIG. 9 the conditions of side 16 of sheet 23 and in FIG. 11 the condition of side 17 of sheet 24. In these figures, the signs of the pressing-in of the raised areas (15 in FIG. 3) of electrode contact-surfaces 9 and 10) of electrodes 1 and 2 are clearly visible. In the embodiment according to FIG. 2, the condition of the sides of sheets 25 and 26 facing the electrodes, after reaching the final value of the pre-pressing force, corresponds approximately to that in FIG. 11, but without the outermost spiral ring therein. Besides of that, also FIGS. 1 and 2 show the condition of the points of weld, mostly in cross-section, after reaching the final value of the pre-pressing force, and it is clearly visible from these figures why the bearing surfaces of the electrodes on the sheets and, in the case of spot-welding (FIG. 2), the bearing surfaces of the two sheets one upon the other, are restricted, and why defined resistances result therewith at the relevant locations, namely as a result of the previously mentioned arching of the sheets in the vicinity of the points of weld.

In the embodiments in FIGS. 1 and 2, the pre-pressing time, from the moment when the pressure begins to rise to the moment at which the welding current is switched on, amounts to about 0.4 sec. Even in the event of large tolerances in the steepness of the rise in pressure (e.g. as a result of fluctuations in the time-constant of the pneumatic means), and in the case of large tolerances in the time required to press the raised areas of the electrode contact-surfaces into the relevant surfaces of the sheet (e.g. as a result of fluctuations in the strength-properties of the sheets to be welded together within a series of welds), this time of 0.4 sec is in any case sufficient for reaching the predetermined final value of the pressure (400 daN) and the predetermined depth of penetration of the said raised areas of the electrode contact-surfaces into the surfaces of the relevant sheets. In this case, thyristor-control 37 for switching on the welding current in the resistance-pressure welding apparatus for executing the present process shown in the circuit-diagram in FIG. 14 contains only a counter coupled to the control of the said pneumatic means, the said counter receives from the control, as soon as the pressure-force starts to increase, a starting signal and releases then after counting off 20 periods or 40 half-periods of alternating current, a signal for switching-on the welding current. However, when such a relatively long time, for example the above-mentioned 0.4 sec, is not available for the pre-pressing time, but the prepressing-time is to be kept as short as possible, it is advantageous to provide the resistance-pressure welding apparatus with a measuring device which measures, either directly or indirectly (e.g. from the level of pressure-force attained), the depth of penetration of the raised areas in the centre of the electrode contact-surfaces and, as soon as the predetermined depth of penetration has been reached, releases to thyristor-control 37 a signal to switch-on the welding current. This has the advantage of permitting a substantial reduction in the relatively long pre-pressing time of 0.4 sec selected in the present case.

At the end of the pre-pressing time, the welding current is switched-on with the aid of thyristor control 37. The thyristor control 37 effects a rectification of the phase-voltages delivered by three-phase input-transformer 38, having the three phases indicated at R, S and T, so that, with the switching on thereof, there is applied to the primary side of the welding transformer 39 a pulsating direct voltage which causes, in the primary side of the said welding transformer, a likewise pulsating direct current increasing in the average proportionally to the function $333A[(1-e^{-t/14 \ msec})+3(1-e^{-t/1400 \ msec})]$. This pulsating direct current, flowing through the primary side of welding transformer 39, produces, at the current-transformation-ratio of 95 in the said welding transformer, in the secondary circuit of the transformer an also pulsating direct current proportional, on an average, to the function $31600A[(1-e^{-t/14 \ msec})-(1-e^{-t/1400 \ msec})]$ which initially rises linearly with time, according to the relationship 2260A·t/msec and, about 50 msec after being switched on by thyristor control 37, changes over to an approximately constant value of about 29000A. With the switching off by thyristor-control 37, about 140 msec after having been switched-on, the secondary current drops, due to the fact that the said thyristor-control reverses the polarity of the pulsating direct voltage applied to the primary side at the moment of switching off, extraordinarily quickly, approximately linearly with time, within about 6.6 msec, to zero. Thereupon, approximately when the secondary current passes through zero, thyristor-control 37 also interrupts the primary current of welding transformer 39 or, to be more precise, the current of the parallel circuit of the primary winding thereof with a base-load resistance guarding the thyristors against an overvoltage and not shown in FIG. 14.

The welding current flowing, after being switched on by thyristor control 37, in the secondary circuit of welding transformer 39, and thus through the point of weld, initially, in the first milliseconds, causes relatively considerable local heating in the area where sheets 23,24;25,26 bear upon each other (i.e., in the embodiment in FIG. 1, in bearing area 30 of annular projection 29 and, in the embodiment in FIG. 2, in the bearing surface between sheets 25 and 26), because, at the moment when the welding current is switched-on, almost the entire resistance of the weld-location is concentrated in this area. This relatively high transition-resistance between the two sheets is due to the fact that the layer of oxide, which covers the untreated aluminum sheets, is conductive only at individual islands unevenly distributed over the surface of the sheets (probably in pores in the layer of oxide), but is non-conductive in the entire remaining area, in accordance with the good insulating properties of aluminum oxide. In the case of two sheets lying one upon the other, most of the current-conductive islands in the layer of oxide on the one sheet adjoin the non-conductive area in the layer of oxide on the other sheet, and only a very few of the current-conductive islands in the layer of oxide on the one sheet, in the bearing area between the two sheets or in the two layers of oxide therebetween, coincide with a current-conductive island in the layer of oxide on the other sheet. (In contrast to this, in the bearing area between a copper electrode and the layer of oxide on an untreated aluminum sheet, all of the current-conductive islands in the layer of oxide meet the current-conductive copper electrode (and therefore, even when the untreated sheets are welded with smooth, nonprofiled electrodes, at the moment when the welding current is switched on, the electrode-sheet contact-resistances are about 10 to 100 times smaller than the transition-resistance between the two sheets). Because of the relatively high transition-resistance between the two sheets, nearly all of the voltage lying at the point of weld drops over this transition-resistance, so that the metal of the sheets to be welded together and of course also the electrode-sheet contacts remain cold in the initial phase immediately after the welding current has been switched on, and initially substantially only such current-conducting islands in the internal layers of oxide on the two sheets are heated over which a current-conducting connection between the two sheets exists. The heating of these islands being current-conducting from the moment of switching on the welding current and of the immediately adjacent metallic areas of the sheets to the melting temperature of aluminum takes place within the first 200 microseconds after the current has been switched on, and from then onwards, these islands initially start to grow (probably because molten metal from adjacent metal areas penetrates the layer of oxide surrounding the islands) and to cover successively also such islands initially adjoining non-conducting areas in the other layer of oxide. With the increase in size of the current-conducting islands, which results in an increase in current-flow cross-section, the transition-resistance decreases, and always, when there is an abrupt increase in current-flow cross-section, resulting from the inclusion of further islands initially adjoining non-conducting areas in the other layer of oxide, there is a corresponding abrupt decrease of the transition-resistance and therewith a corresponding abrupt decrease of the voltage lying over the point of weld. Since, as already indicated hereinbefore, the welding current increases simultaneously approximately linearly with time, there result irregular voltage fluctuations over the point of weld in the time during which the said current-conducting islands are becoming larger, and these fluctuations are clearly recognizable in an oscillogram recording the voltage pattern over the point of weld during the first 5 milliseconds after the current has been switched-on. As soon as the growing, current-conducting islands cover the entire bearing area between the two sheets, the irregular voltage fluctuations cease with a concluding sharp voltage-drop, which characterizes the final breakdown of the transition-resistance between the two sheets, and a subsequent change-over of the voltage to a value which remains almost constant over several milliseconds.

Since transition-resistance exists for such a short time, i.e., between 2 and 3 milliseconds, compared to the total welding time, e.g., of 140 msec and more generally between 50 and 150 msec, the practical result is virtually the same as if the transition-resistance were substantially non-existent. In order to take account of this, throughout the present description the term "transition-resistance" has been used only to refer to the resistance between the two sheets in the currentless condition or during the first 2 to 3 msecs after the welding current has been switched-on. In order to clearly differentiate between the transistor resistance and the resistance arising during the main part of the welding time following the break-down of the transition-resistance, the latter is referred to in terms such as "the portion of the overall resistance of the point of weld formed by the metal and the internal layers of oxide", and similarly worded designations. Further, when the general term "overall resistance of the point of weld" is used, this means, as a rule and unless otherwise indicated, the overall resistance of the point of weld arising during said main part of the welding time, and especially at the beginning thereof (i.e. immediately after the sharp voltage-drop at the final break-down of the transition-resistance), since the overall resistance of the point of weld corresponds at the beginning of the main part of the welding time fairly accurately to the sum of the cold metal-resistances and contact-resistances of the point of weld. However, of the melting of the metal of the sheets setting in at the beginning of the main part of the welding time, and because of the higher conductivity of molten metal, the overall resistance of the point of weld decreases progressively during the main part of the welding time.

Figure 13:
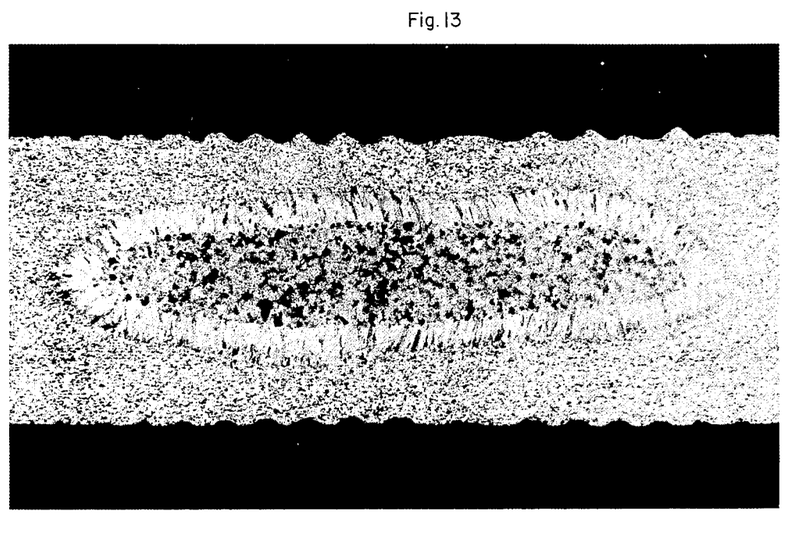
FIG. 13 is a cross-micrograph through a weld produced by the present process using electrodes with profiled contact-surfaces.

From the break-down of the transition-resistance onwards, the current-heat supplied to the point of weld is distributed, proportionally to the ratio between the contact-resistances and the resistance formed by the metal of the sheets to be welded together, to the electrode-sheet contacts and the metal of the sheets, and as a result of the relatively low contact-resistances of the electrode-sheet contacts, as compared with the resistance of the metal of the sheets, most of the current-heat is supplied to the metal. The relatively small portion of heat arising at the electrode-sheet interfaces is mostly carried away again by the cooling of the electrodes. However, additional heat is supplied to the electrode-sheet contacts by means of thermal conduction from the central zone of the melt, so that from the beginning of the melting of the metal of the sheets after said break-down of the transition-resistance at the bearing surface of the sheets on, the temperature at the electrode-sheet interfaces begins to rise relatively quickly, and thus, also the temperature of the electrodes. Now it is important that the temperature at the electrode-sheet contacts does not reach the alloying-on temperature, and to this end, the time during which the current is switched on by the thyristor-control may be relatively short and relatively high welding currents are used, and then the melting of a part of the metal and the softening of the remainder thereof at the point of weld will proceed relatively quickly so that not enough heat can be transported in this short time to the electrode-sheet contacts to heat them to the alloying-on temperature. Alternatively as is done in the present embodiments, the time during which the current is switched-on by the thyristor control may be made relatively long and relatively low welding currents are used, and then, because of the smaller amount of current-heat supplied per unit of time, melting of a part of the metal and softening of the remainder thereof takes longer so that a larger portion of the total current-heat supplied is transported, by thermal conductivity, to the electrode-sheet contacts. At the same time, however, the amount of heat supplied to the electrode-sheet contacts per unit of time, by thermal conductivity, decreases, because of the smaller current-heat-supply per time unit in connection with an approximately constant carrying off of heat per unit of time, and therefore, the difference between the heat supplied to and the heat carried off from the electrode-sheet contacts per unit of time, which effects the heating of the said electrode-sheet contacts, is reduced to such an extent that it is, in spite of the longer time and the therefore totally greater amount of heat transported by thermal conductivity to the electrode-sheet contacts, not sufficient to heat the electrode-sheet contacts to the alloying-on temperature. The first mentioned alternative, in which the current is switched on for a shorter time and the welding current is higher, requires more accurate control of the time during which the current is switched on and of the welding current, but results in somewhat less softening of the outer surfaces of the sheets at the point of weld and, for this reason, it is somewhat more suitable for spot-welding according to the embodiment of FIG. 2 where cambered electrodes are used and should be pressed-in as little as possible. The last mentioned alternative is not critical in the adjustment of the time during which the current is switched-on, but it leads to somewhat increased softening of the outer surfaces of the sheets at the point of weld and is therefore more suitable for projection-welding according to the embodiment in FIG. 1 where flat electrodes are used and therefore, there is no danger of spherical impressions such as those which appear when cambered electrodes are used. In both alternatives, however, the softening of the outer surfaces of the sheets is in any case such that electrodes 1,2;3,4 sink further into sheet-surfaces 16,17;18,19, in the central areas of the point of weld to about the depth of the spiral grooves 9,10;11,12, as may be seen quite clearly in the cross-cut through a weld produced by the present process which is shown in FIG. 13.

Figure 14:
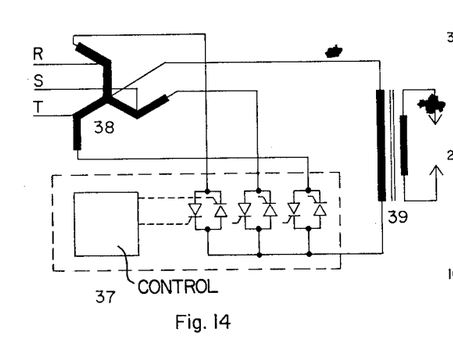
FIG. 14 is a circuit diagram of a welding machine for the execution of the present process.

Since after switching off by thyristor-control 37 or, to be more precise, after the previously mentioned reversal of polarity of the pulsating dircet-current voltage applied to the primary side of welding transformer 39, the welding current still flows in the welding-current circuit and therewith in the secondary circuit of welding transformer 39 over the so-called decay-time, i.e. at least over the above-mentioned 6.5 msec, the pressure acting upon movable electrode 1.3 must also be maintained after said switching off by thyristor control 37. However, this so-called after-pressing is not only necessary because welding current flows still after said switching off over the so-called decay-time but it is also important from another point of view: When the weld-lens, formed at the point of weld by recrystallization of molten metal, cools down, stresses directed towards the periphery of the weld-lens arise in the interior thereof as a result of contraction of the metal as it cools, which stresses may lead, before recrystallization, to the shrink-holes in the core of the lens, or, in the already recrystallized core of the lens, to cracks, and, as well known, the formation of such shrinkholes and cracks can be counteracted by after-pressing, because the pressure on the weld-lens caused by this after-pressing effects, with a sufficiently high after-pressing force, a compression of the weld-lens and therewith a reduction of the volume thereof, which compensates the said stresses. For this reason, the pressure acting upon movable electrode 1,3 is maintained at the same level during an after-pressing time of about 0.2 sec.. At the end of this time, the pressure is removed by means of the said pneumatic means and the electrode is lifted off from the point of weld, whereupon welded sheets 23,24;25,26 may be taken out of the welding machine.

Figure 10:
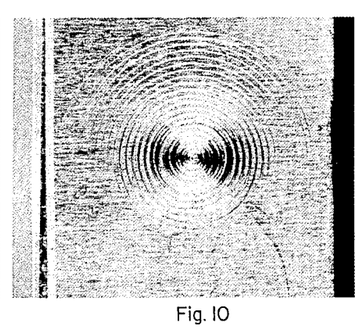
FIG. 10 shows the condition of the contact-surface, facing the projection-side electrode, of the aluminum sheet provided with an annular projection prior to the welding, upon completion of the projection-weld according to the present process.
Figure 12:
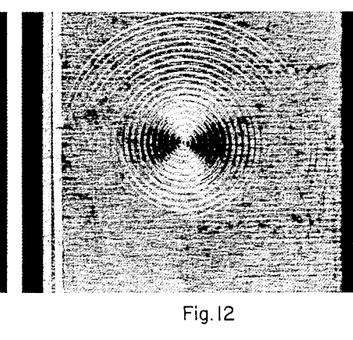
FIG. 12 shows the condition of the contact-surface, facing the flat-sheet-side electride, of the flat aluminum sheet, upon completion of the projection-weld according to the present process.

For the embodiment in FIG. 1, the condition of the sides of the sheets facing the electrodes, upon completion of the weld, is shown in FIGS. 10 and 12, and that in FIG. 10 the condition of side 16 of sheet 23 and in FIG. 12 the condition of side 17 of sheet 24. A comparison of these FIGS. 10 and 12 with corresponding FIGS. 9 and 11, which show the condition after pre-pressing and before the current is switched-on, shows quite clearly the above-mentioned further sinking of electrodes 1 and 2 into sheet-surfaces 16,17 during the switching-on time of said thyristor-control 37 and the subsequent after-pressing time, and that by the substantially larger number of impressed spiral rings. In the embodiment according to FIG. 2, the condition of the sides of sheets 25,26 facing the electrodes, upon completion of the weld corresponds approximately to that in FIG. 12, but without the outer 7 spiral rings appearing in this figure.

Figure 8:
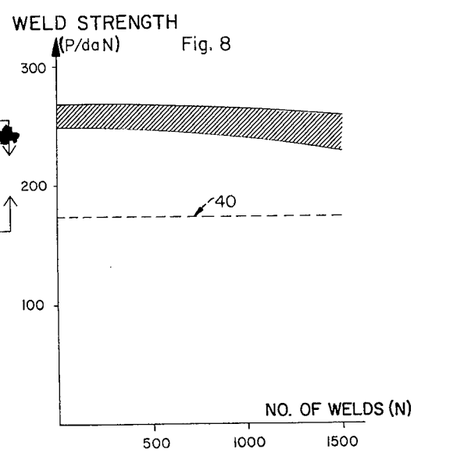
FIG. 8 is a diagram showing the shearing stressability of welds, made by the present process with untreated aluminum sheets, with the shear-fracture force measured over the number of welds carried out, without intermediate treatment of the electrodes, until the welding of the object measured.

The diagram in FIG. 8 shows the shearing stressability of welded joints of untreated aluminum sheets produced according to the present process. In FIG. 8, the measured shear-fracture force p over the number of welds n carried out, without intermediate treatment of the electrodes, until the welding of the object measured is shown for several series of welds, in each of the series, the welds have been carried out consecutively with no intermediate treatment of the electrodes. As may be gathered from FIG. 8, the shear-fracture forces of welded joints produced according to the present process are, with average values of about 250 daN, far above the average value of daN 173 (dotted line 40 in FIG. 8) required in the aircraft industry for aviation-qualification of welded joints of aluminum, and the shear-fracture forces show only a relatively slight decrease in the average of about 15 daN, over the entire electrode-life of 1500 welds. Also the scattering of the shear-fracture forces of welded joints produced according to the present process is relatively slight, as can be seen in FIG. 8. It amounts, together with the decrease during the life of the electrode, to only about 40 daN, and the scattering range lies between 230 and 270 daN.

Figure 4:
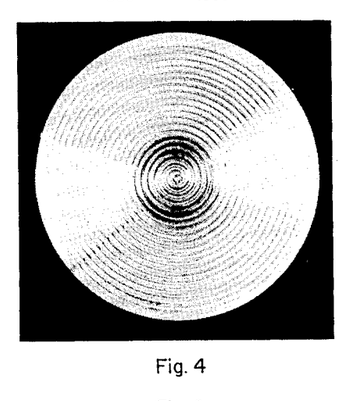
FIG. 4 shows the condition of the contact surface on the projection-side electrode, after half the electrode-life, during the projection welding of aluminum sheet according to the present process with a profiled electrode contact-surface.
Figure 5:
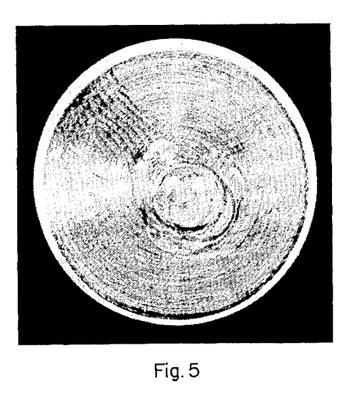
FIG. 5 shows, by way of comparison, the condition of the contact-surface of the projection-side electrode after only six welds, during the projection welding of untreated aluminum sheet with electrodes having a flat contact-surface.
Figure 6:
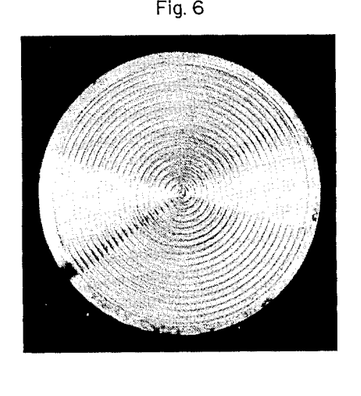
FIG. 6 shows the condition of the contact-surface of the flat-sheet-side electrode, after half the electrode life, during the projection welding of untreated aluminum sheet according to the present process, with electrodes having profiled contact-surfaces.
Figure 7:
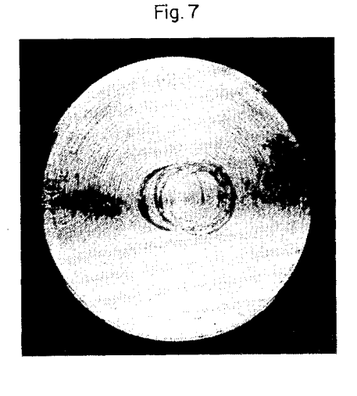
FIG. 7 shows, by way of comparison, the condition of the contact-surface of flat-sheet-side electrode, after only six welds, during the projection welding of un-treated aluminum sheet with electrodes having flat contact-surfaces.

For the embodiment according to FIG. 1, in FIGS. 4 and 6, the condition of the electrode contact-surfaces after half the electrode-life is shown, and that in FIG. 4 the condition of contact-surface 5 of electrode 1 and in FIG. 6 the condition of contact-surface 6 of electrode 2. As may be seen, apart from a slight greyish colouration at contact-surface 5 of electrode 1 in FIG. 4 in the range facing the backside of the projection, there are scarecely any evidence in FIGS. 4 and 6 of the large number of welds already carried out with these electrodes without intermediate treatment. On the contrary, in the groove-wall areas adjacent said raised areas which bearing during welding upon unoxidized workpiece material, these electrode contact-surfaces shine as if polished. In contrast to this, flat electrodes used in place of the profiled electrodes have, under the same operating conditions, after only six welds of untreated aluminum sheets carried out as in the embodiment of FIG. 1, the appearance shown in FIGS. 5 and 7, i.e. the electrode on the projection-side has, as can be seen in FIG. 5 already some alloying-on in the area facing the backside of the projection, and the electrode on the other side of the sheets has, as can be seen in FIG. 7, in the same area, already a strong grey colouration which will shortly lead to alloying-on. A comparison of FIGS. 5 and 7 with FIGS. 4 and 6 thus indicates the obvious superiority of the present process over the known resistance-pressure welding methods for welding together aluminum sheets.

I claim:

1. In an electrical resistance-pressure-welding process for welding together parts of aluminum metal and/or its alloys carrying a surface layer of aluminum oxide, by a welding current supplied through opposed electrodes, each provided with a resilient electrode follow-up, in which the parts to be welded together are first pre-pressed together by means of said resilient follow-up before the welding current is switched on and such pressure is continuously maintained during the flow of welding current, the improvement wherein at least one of the surfaces of such parts facing the electrodes is superficially deformed plastically during said pre-pressing without penetrating the part thickness to thereby disrupt the surface-layer of aluminum oxide at the locations of deformation and bring substantially unoxidized metal of said part thus exposed into direct pressure contact with the adjacent electrode, the extent of the resultant direct contact between the electrode and the substantially unoxidized metal being sufficiently large that contact-resistance across the interface between each such electrode and the corresponding part is significantly lower than the resistance at the point of weld between the parts, and the duration of welding and welding current are controlled in relation to each other so that the temperature of such electrode at said interface is below the alloying-on temperature of the metal in contact therewith.

2. A process according to claim 1, wherein the opposite surfaces of the parts facing the electrodes are both superficially deformed plastically in substantially the same manner.

3. A process according to claim 1, wherein each such part surface is superficially deformed plastically in the said manner, the extent of such deformation being such that the electrode-part contact-resistance amounts to less than 30% of the overall resistance of the point of weld arising immediately after the breakdown of the transition resistance between said parts of workpieces.

4. A process according to claim 3, wherein said plastic deformation is sufficiently extensive that the electrode-part contact-resistance is less than 10% of said overall resistance.

5. A process according to claim 1, wherein each such workpiece surface is superficially deformed plastically to such an extent that the transition resistance between said parts amounts, when the welding current initially is switched on, to more than 90% of the overall resistance of the point of weld.

6. A process according to claim 1, wherein one of the two parts to be welded together is provided with a projection directed toward the other part for the purpose of increasing the ratio between the fraction of said overall resistance of the point of weld formed by the metal of said workpiece parts and the fraction of said overall resistance formed by the electrode-workpiece contact resistance, before said pre-pressing.

7. A process according to claim 6, wherein each such part surface facing the electrodes is superficially defomred plastically in said manner to such an extent that the area of direct contact between the electrode and the substantially unoxidized metal of said part amounts, immediately before the current is switched on, to between one quarter and four times the area of contact of said projection after deformation during said pre-pressing.

8. A process according to claim 1, wherein for the purpose of achieving said superficial plastic deformation, the end faces of said electrodes are provided with shallow raised areas and contiguous recessed areas, said raised areas under said pre-pressing pressure being adapted to press into the corresponding workpiece parts while said recessed areas come into contact with substantially unoxidized workpiece material.

9. A process according to claim 8, wherein said electrodes have a profiled end face with a pattern of grooves of triangular or trapezoidal cross-section.

10. A process according to claim 8, wherein in order to prevent changes in the shape of the electrode end faces during said pressing-in, said end faces of said electrodes are made of a material having a compressive strength higher than that of the part metal.

11. In an electrical resistance-pressure-welding apparatus for welding together parts made of aluminum metal and/or alloys thereof and having surface layers of aluminum oxide, comprising electrodes for supplying welding current to the parts, means for switching on the welding current and means including a resilient electrode follow-up for at least one electrode for pre-pressing the workpiece-parts to be welded together, before the welding current is switched on, and for maintaining a continual pressure upon the parts to be welded together during the flow of the welding current, the improvement wherein at least one of the electrodes is provided with means for causing superficial plastic deformation of the adjacent part surface during the pre-pressing to thereby disrupt said oxide surface-layer and bring substantially unoxidized metal into direct contact with the electrode, and including means for controlling said switching-on the welding current in response to the achievement of sufficient plastic deformation of said surface that the contact resistance across the interface between each such electrode and the corresponding part is significantly lower than the resistance at the point of weld between said parts, and means for regulating the duration of welding current flow and the magnitude of the welding current in relation to each other so that the temperature of the electrode at said interfaces can be maintained below the alloying-on temperature of the metal in contact therewith.

12. An apparatus according to claim 11, characterized in that both of said electrodes are provided with same means for causing said superficial plastic deformation of the adjacent surfaces on the workpieces.

13. An apparatus according to claim 11, wherein said means for causing said plastic deformation comprise a profiling of the electrode contact-surfaces in a pattern of grooves of triangular or trapezoidal cross-section.

14. An apparatus according to claim 13, for projection-welding of aluminum sheets, wherein each electrode-contact surface is formed by raised areas lying in a plane and separated by recesses forming the profiling.

15. An apparatus according to claim 14 for spot-welding aluminum sheets, characterized in that the electrode contact-surface is formed by raised areas lying in a cambered surface and separated by recesses forming the profiling.

16. An apparatus according to claim 12 for roller-seam welding of aluminum sheets, wherein said electrodes take the form of the rollers provided on their peripheries forming the contact-surfaces with grooves forming the profiling.

17. An apparatus according to claim 16, wherein said control means for switching-on the welding current comprises a thyristor-control effective to periodically interrupt said welding current and create current-free intervals for the advance movement of said roller electrodes and the resulting pre-pressing ofthe workpiece parts.

18. An apparatus according to claim 11, characterized in that the electrodes consist of a copper alloy containing alloying parts of the group comprising the substances chromium, zirconium, cadmium, beryllium, nickel, silicon, manganese and iron, and having a 0.2 yield-strength at least three times as high as that of pure soft copper and at least 75% of the electrical conductivity of pure copper.

* * * * *